United States Patent [19]

Chaum

[11] Patent Number: 5,126,978
[45] Date of Patent: Jun. 30, 1992

[54] UNDERSEA DATA COLLECTION, ANALYSIS, AND DISPLAY SYSTEM

[75] Inventor: Erik Chaum, Middletown, R.I.

[73] Assignee: The United States of America as represented by the Secretary of the Navy, Washington, D.C.

[21] Appl. No.: 691,581

[22] Filed: Apr. 23, 1991

[51] Int. Cl.$^5$ .............................. H04B 1/06
[52] U.S. Cl. ................... 367/135; 367/131
[58] Field of Search .................. 367/135, 131

[56] References Cited

U.S. PATENT DOCUMENTS 4,101,891 7/1978 Jain et al. ................ 342/25

*Primary Examiner*—Daniel T. Pihulic
*Attorney, Agent, or Firm*—Michael J. McGowan; Prithvi C. Lall; Michael F. Oglo

[57] ABSTRACT

A device and process is disclosed for creating detailed volumetric ocean models, which in turn are used as inputs for naval tactical and oceanographic analysis. Near-real-time volumetric modelling is accomplished by continuously integrating, filtering, interpolating, and extrapolating oceanographic data (e.g., temperature, sound velocity, conductivity, salinity, bathymetry, current, chlorophyll) from historical data bases, forecasts, remote sensors, and onboard sensors. The value of the invention can be appreciated in the detailed, time-varying, three-dimensional ocean models which can be realized for mesoscale and smaller areas and the ability to use these more detailed and timely ocean models for three-dimensional acoustic propagation predictions and combat control algorithms. Tactical and oceanographic models are computed using an advanced processor and the results are displayed using three-dimensional visualization softwaare and hardware techniques. The invention may be used from a submarine, surface ship, or aircraft.

15 Claims, 7 Drawing Sheets

UNDERSEA DATA COLLECTION, ANALYSIS, AND DISPLAY SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to computer-based techniques for deriving three-dimensional models of time-varying oceanographic data, suitable for improved tactical and oceanographic analysis and more particularly to an innovative combination of known technologies and techniques from the fields of sensors, geographical data management and analysis, volumetric data visualization and analysis, advanced computer processors, and display systems.

(2) Description of the Prior Art

Naval tacticians and oceanographers know how complex the ocean environment is, but traditionally they have had limited capability to measure and analyze its complexity in situ. Onboard naval ships, submarines, and aircraft (i.e., naval platforms) this has been particularly true, and most acoustic propagation predictions and dependent tactical algorithms use as inputs averaged historical and infrequently collected in situ data. These data are generalized as being representative of the surrounding ocean volume. The clear need for detailed local environmental information is reflected in current U.S. Navy systems such as the Tactical Oceanographic Monitoring System (TOMS), Improved Oceanographic Sensor (IOS), and Anti-Submarine Warfare Tactical Decision Aid (ASWTDA). The first two systems provide continuous data collection from hull-based sensors, and simple parameter timeline displays. ASWTDA uses a batch processing technique to provide area-wide predictions of a limited number of oceanographic parameters based primarily on historical and limited in situ data from oceanographic sensor systems like the expendable bathythermographs (XBT). Systems like TOMS and IOS provide continuous monitoring of conditions outside the hull, but they do not provide a volumetric understanding of the ocean. Present oceanographic forecasting and acoustic propagation modelling techniques, such as ASWTDA, provide only coarse, predominantly historical, volumetric calculations. Thus, current systems do not provide the continuous real-time model of the time-varying three-dimensional ocean environment desired for naval and research operations.

SUMMARY OF THE INVENTION

Accordingly, it is the general purpose and object of the present invention to provide a means by which ships, submarines or other underwater vehicles, or aircraft can create three-dimensional models of the local oceanographic environment using historical, forecasted, and continuous in situ data measurements such that improved tactical and oceanographic modelling may be realized.

Another object of the invention is to enable the detection and display of changes which occur over time in the ocean environment.

Another object of subject invention is to use said environmental models as inputs to other tactical and oceanographic models of interest to the user.

Still another object of the invention is to recompute and redisplay the tactical and oceanographic models on a frequent periodic basis.

Still another object of the invention is to use three-dimensional modelling and continuous data collection to provide an effective method for evaluating and improving derived model quality.

A further object of the invention is to utilize existing techniques for data collection, geographic information management, volumetric analysis, visualization, and display, as well as advanced computer architectures and processors.

Yet another object of the invention is to support such data collection, modelling, and analysis processes with an embedded management component that simplifies system use and improves efficiency.

A further object of the invention is to accomplish in situ data collection measure along a large vertical slice of the ocean with a minimum of additional towed devices.

These objectives are accomplished with the present invention by providing a system which is suited for collecting, integrating, managing, modelling, analyzing, and displaying time-varying three-dimensional data. The invention may use data from any existing environmental measurement system, including hull-mounted, towed, expendable, or remote (aircraft or satellite-based) sensors. Platforms equipped with the invention may work in concert, sharing collected data to improve the derived model quality, or to reduce the time to collect data, or both. A data management system archives and filters collected data. Historical, forecasted, and measured data are merged, based on a spatial and temporal weighting scheme, and then is used to generate, through a process of interpolation and extrapolation, a full volumetric data set for the local volume of interest. The quality of volume data set quality is continuously assessed by comparing it with real-time measurements as the platform moves through the volume. Further, this quality assessment information is fed back to improve the volume-modelling process. The derived volume data sets serve as input data for other oceanographic and tactical models designed to exploit three-dimensional input data sets. The data management system is again used to archive, analyze, and serve the oceanographic and tactical model results. The invention can render the derived volume data sets or oceanographic and tactical models in three-dimensional display formats suitable for interpretation by the user. An advanced processing architecture, suitable to parallel processing tasks, is employed by the invention to provide the requisite speed required to perform the complex three-dimensional computations frequently. A more complete understanding of the present invention and the attendant advantages thereof may be gained from the following specification when read in conjunction with the appended drawings wherein:

DESCRIPTION OF THE PREFERRED EMBODIMENT (1) System Description

Figure 1:
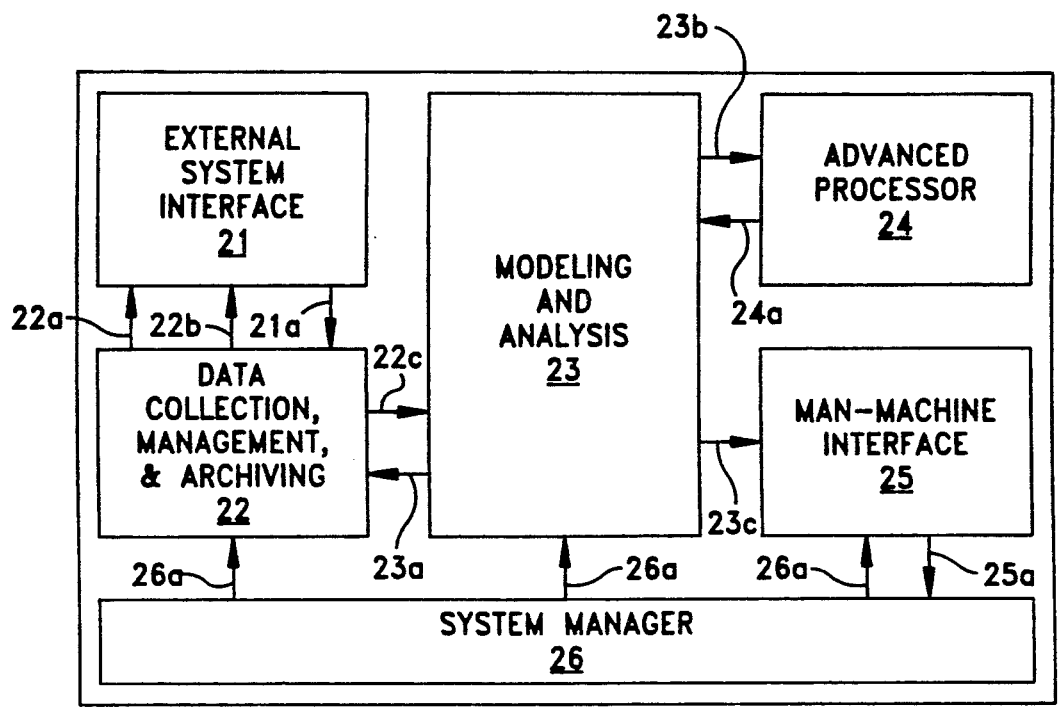
FIG. 1 presents a top-level block diagram of the present invention showing the external system interface, data management, modelling and analysis, advanced processor, man-machine interface, and system management components.

The invention may be realized in a number of physical embodiments. The following conceptual description and operational overview is generic in the sense that it is made without specifying particular hardware or software. Interfaces described are generic and do not represent a specific physical implementation. Referring now to FIG. 1 there is shown a block diagram of a system 20 of the present invention comprised of an external system interface 21 for receiving and sending data, a data management component 22, a modelling and analysis component (containing ocean and tactical models) 23, an advanced processor 24 (e.g., parallel) for accelerating numerical computations, man-machine interface 25 for device control and display, and a system manager component 26 which oversees various system operations.

Figure 2:
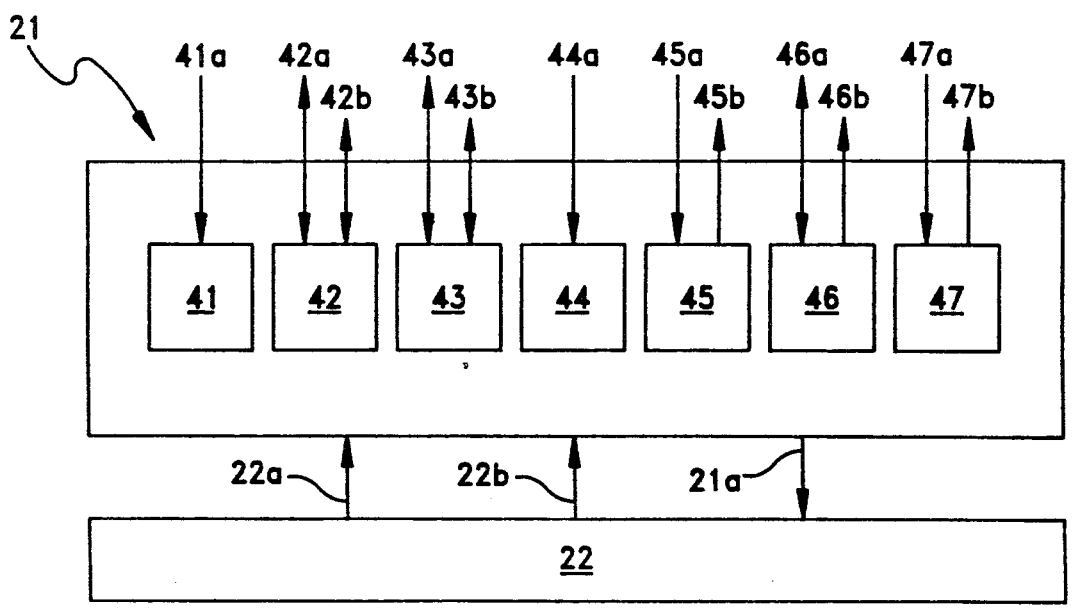
FIG. 2 presents a block diagram showing the external system interface component in greater detail.

External interface 21, shown in greater detail in FIG. 2, is managed by 22 using control interface 22a. It passes data to 22 via data interface 21a, and receives data to transmit to other systems via data interface 22b. External interface 21 may be thought of as a data acquisition and communications system comprised of: a link 41a and interface 41 to hull-mounted and towed environmental sensors; a two-way communications link 42a and interface 42 supporting data transfer and queries 42b to other platforms with similar systems; a two-way communications link 43a and interface 43 supporting data transfer and queries 43b to and from other types of tactical or oceanographic systems (e.g., an existing submarine combat control system); an input link 44a and interface 44 to other existing platform sensors (e.g., navigation system, fathometer); an input link 45a and interface 45 supporting data queries 45b of historical data bases held in other systems; a two-way communications link 46a and interface 46 supporting data transfer and queries 46b to off-platform synoptic oceanographic models (e.g., US Navy's Optimum Thermal Interpolation System (OTIS)); and an input link 47a, and interface 47 supporting data queries 47b to obtain off-platform remote sensor data (e.g., satellite imagery).

Figure 3:
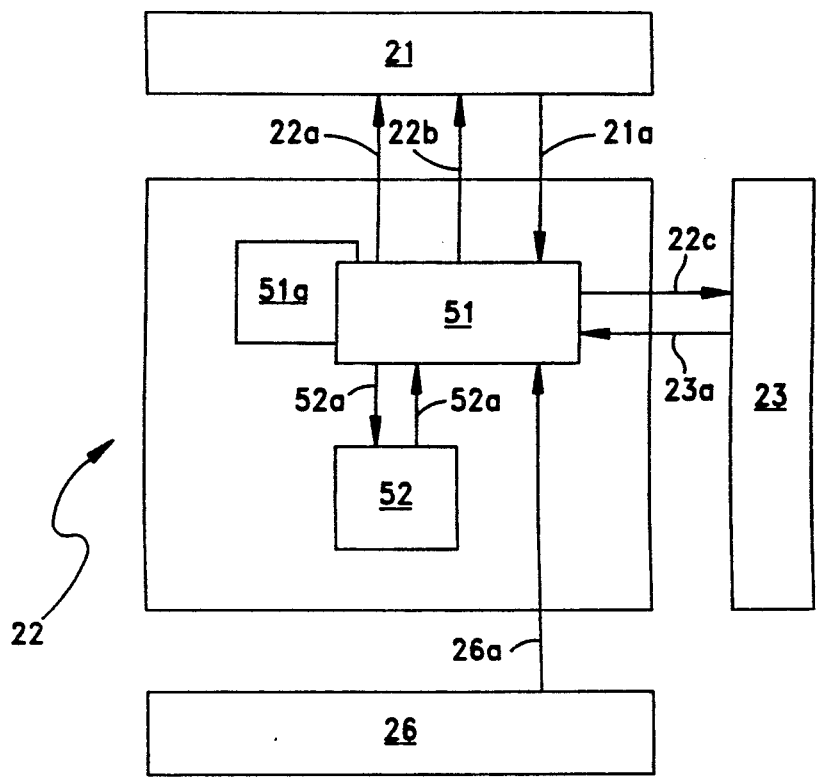
FIG. 3 presents a block diagram showing the data management component in greater detail.

Component 22 shown in greater detail in FIG. 3 and comprised of a geographical information system 51 and data storage systems 52 (e.g., optical disk, magnetic disk, tape), is managed by 26 using control interface 26a, and performs various data collections via 21a and 23a; data management; data filtering; data serving via 22b and 22c; and archiving tasks 52a employing topological, relational, thematic, neighborhood, and network analysis techniques as are known to be employed by commercial geographical information systems (e.g., ARC/INFO by Environmental Systems Research Institute, Inc.). Such techniques are employed by system application software 51a to perform said tasks.

Figure 4:
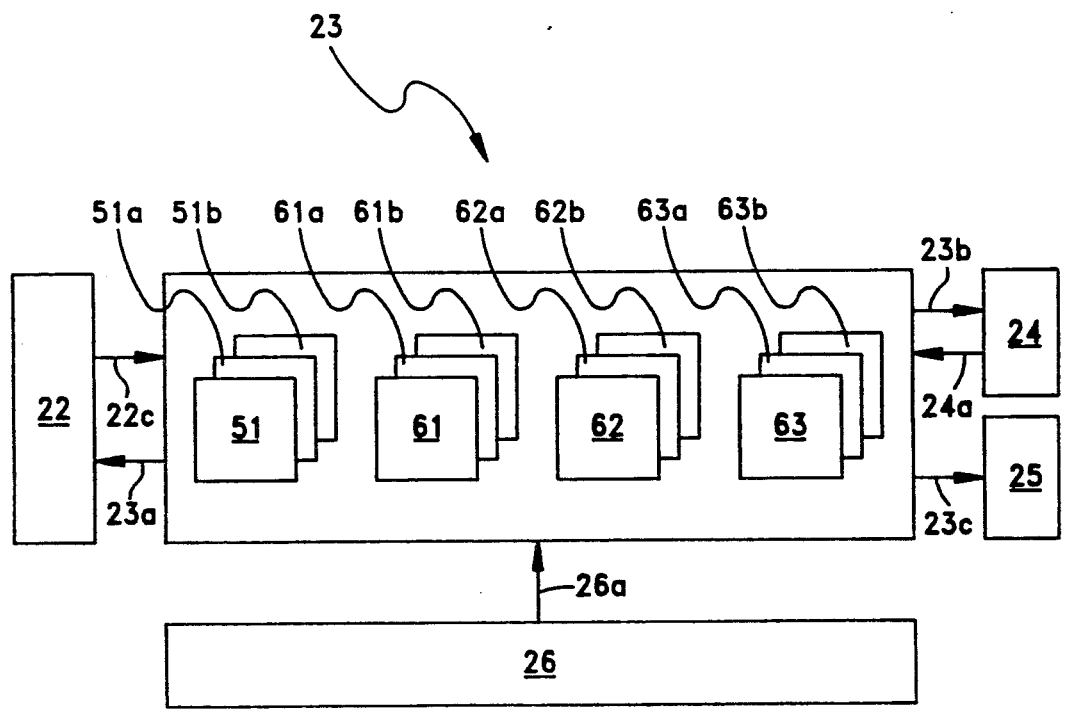
FIG. 4 presents a block diagram showing the modelling and analysis component in greater detail.

Modelling and analysis component 23 is shown in greater detail in FIG. 4. It is also comprised of a geographical information system 51 with application software 51a and 51b; a volumetric data analysis and visualization system 61 with application software 61a and 61b; oceanographic modelling and analysis systems 62 with application software 62a and 62b; and tactical modelling and analysis systems 63 with application software and 63a and 63b. Component 23 is managed by 26, using control interface 26a and performs oceanographic modelling and analysis tasks, of data provided by component 22 through interface 22c, by employing various volumetric interpolation, extrapolation, and topological analysis techniques as are known to be employed by geographical information systems, or by commercial volumetric data analysis and visualization systems (e.g., Interactive Volume Modelling by Dynamic Graphics, Inc.), or by various algorithmic techniques which are known to be useful in computing oceanographic and tactical models. As shown in FIG. 4 any of the modelling and analysis components may pass data through interface 23b to an advanced processor component 24 (e.g., the IPSC/2 or IPSC/3 from Intel) to perform iteration intensive calculations rapidly. Results are returned to component 23 via data interface 24a. When modelling and analysis results of these calculations are useful to other modelling tasks, or are to be archived, they are sent to component 22 via data interface 23a. When results are to be displayed component 23 renders the volumetric data set or model results using volumetric visualization techniques as are known to be employed in commercial systems and provides them via data interface 23c to man-machine interface component 25. Software 51a and 51b represent the family of applications that are generally known or maybe readily implemented using geographic information systems 51. In a similar manner the same is true for software associated with components 61, 62, and 63 which represent volume visualization, ocean and tactical modelling respectively. An example of 51a is a platform movement planning module which is intended to optimize volume sampling, simplify system use, and improve system modelling efficiency. The platform movement planning module utilizes the functional capabilities of the geographic information system to analyze platform position history and display a recommended schedule of courses, depths, and speeds.

Figure 5:
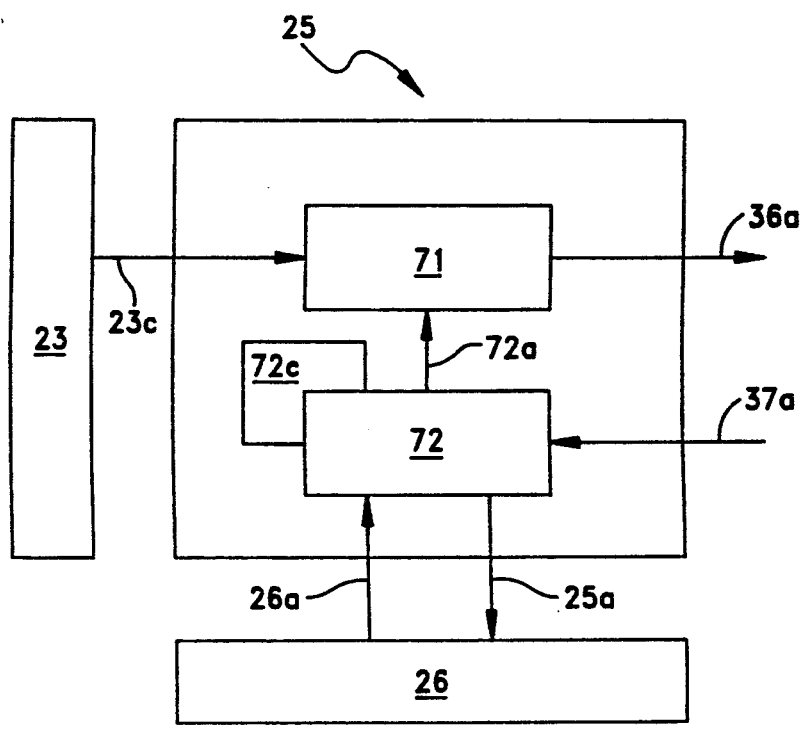
FIG. 5 presents a block diagram showing the man-machine interface component in greater detail.

Man-machine interface component 25, is shown in greater detail in FIG. 5. It employs a high performance commercial computer graphics display system 71 and control system 72 (e.g., SGI 4D family by Silicon Graphics, Inc.) with man-machine interface software 72c. It rapidly transforms and smoothly renders volumetric data and other displayed information 36a. Interface devices 37a (e.g., mouse, keyboard, voice commands) are used by the operator to control the displayed volume viewpoint, data sets to be displayed, and system operations. System control inputs are passed via control interface 25a to the system manager component 26.

Figure 6:
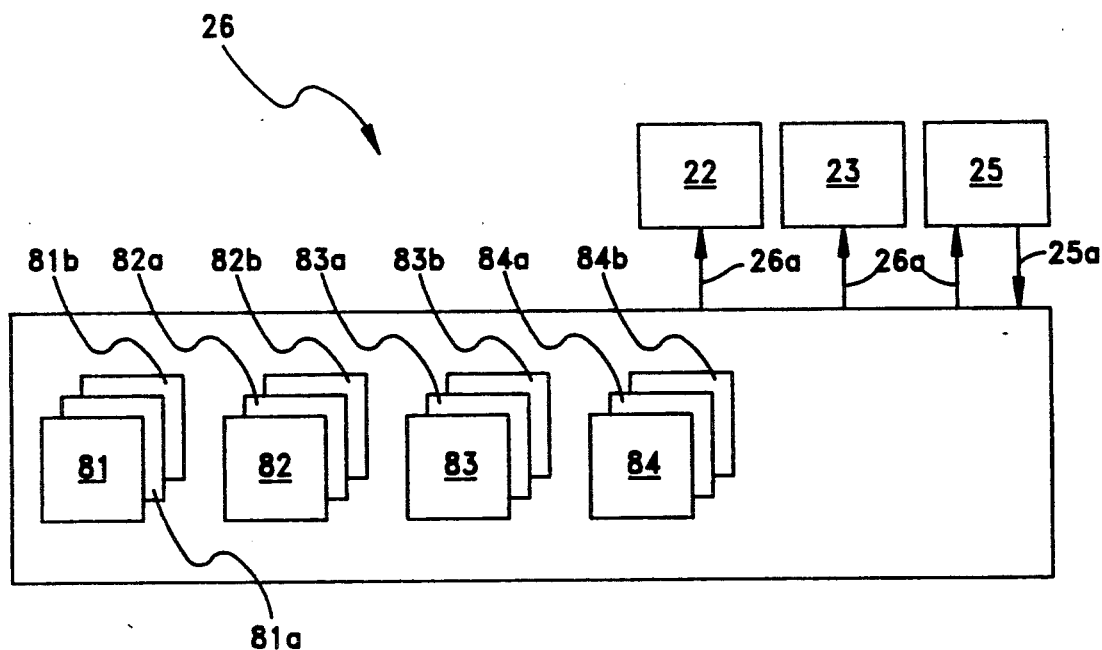
FIG. 6 presents a block diagram showing the system management component in greater detail.

System manager component 26, is shown in greater detail in FIG. 6. It performs the tasks required to oversee the continuous flow of data and information from sensor to display by employing a variety of system management 81 (i.e., executive functions), resource management 82, performance monitoring and fault location (PM/FL) 83, and communications management 84 techniques in response to events generated by system operations and user interaction. Said techniques may be implemented to optimize system operations using known software technologies such as, but not limited to, control/algorithmic logic, rule-based and case-based reasoning, network analysis, and real-time control. 81a and 81b represent a family of potentially many software modules that perform necessary system management 81 tasks. In a similar manner, software associated with components 82, 83, and 84 are shown as 82a and 82b, etc.

Figure 7:
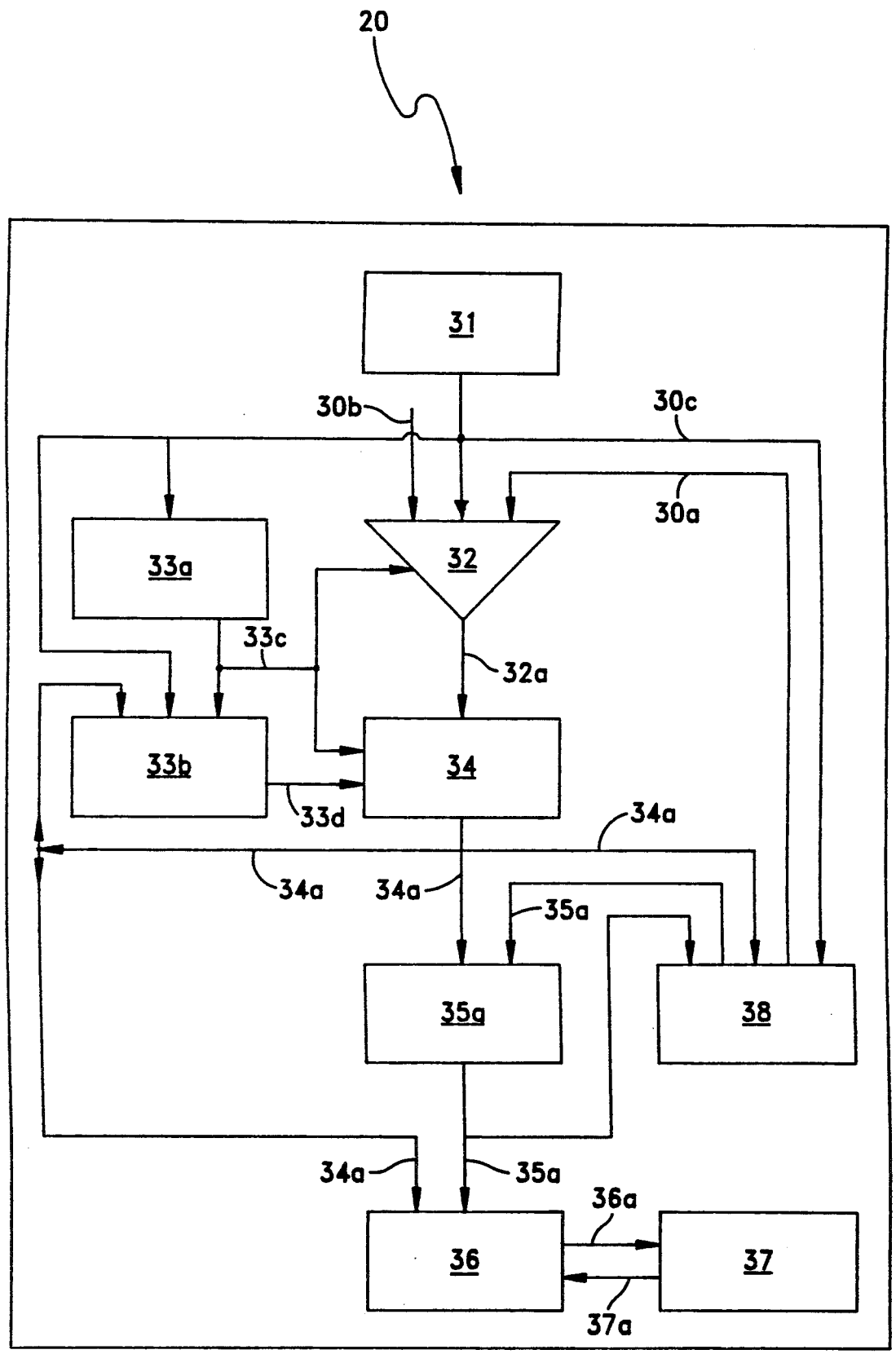
FIG. 7 presents a block diagram which shows the processing flow of data and information within the system.

The basic operational flow of data within the system is shown in FIG. 7. It can be understood as a continuous data collection, archiving, analysis, and display processes. Historical data 30a, and data from external synoptic models 30b, are used to initialize the ocean data set for the ocean volume of interest (VOI). Once a platform equipped with the system has begun operating in the VOI, data measured in situ 30c, through a continuous or periodic sampling process using platform sensors 31, is merged with the initial data and then passed through a spatial and temporal filter process 32. Eventually, the in situ data may fully replace historical and synoptic data. Measured data is also analyzed 33a to derive local gradient and structural statistics 33c (e.g., fractal dimension) which are used as control parameters for data filtering 32, volume modelling 34, and modelling quality estimations 33b. The filtering process produces a best "raw" data set 32a for a given time period. The raw data set 32a, structural statistics 33c, and model quality estimates 33d, are inputs to the interpolation, and extrapolation process performed to accomplish volume modelling 34 of the full VOI. Three-dimensional ocean models 34a, previously computed tactical models 35a, and viewpoint information are inputs to tactical and oceanographic applications 35. Ocean models 34a and tactical model 35a results for the VOI are rendered in three-dimensions 36 and displayed 36a for operator 37. All data, intermediate, and final modelling results are archived in a data base 38. The user provides control information (including viewpoint preferences) via 37a. FIG. 7 is a continuous process, that is, as the platform moves through the VOI new data is measured, old data is filtered out, volumetric ocean models are incrementally improved, and tactical models are periodically recomputed to account for ocean model changes and platform position changes within the volume. Component 26 manages this process so that to the maximum extent possible the operator need only specify what information he desires to see.

As the platform moves through the VOI the system's continuous processing enables it to evaluate the local quality of the derived oceanographic model by comparing computed and measured values. Additionally, because the system inherently annotates each of the ocean parameter data sets with spatial and temporal data, uncertainty information can be directly derived and used in situ for many purposes including planning data sampling tracks (paths through the ocean), and evaluating the validity/confidence of derived oceanographic and tactical models. Yet another innovative and important capability of the system is its inherent ability to evaluate volumetric changes over time. This is realized in two ways. First, each time the platform's track crosses over itself changes within the volume at that location, during the intervening time interval, may be measured. Platform track planning can exploit this technique. Second, the system can compute a volumetric model of the difference between derived volume models from different time intervals and in this way highlight and estimate the degree of change within the volume.

Figure 8:
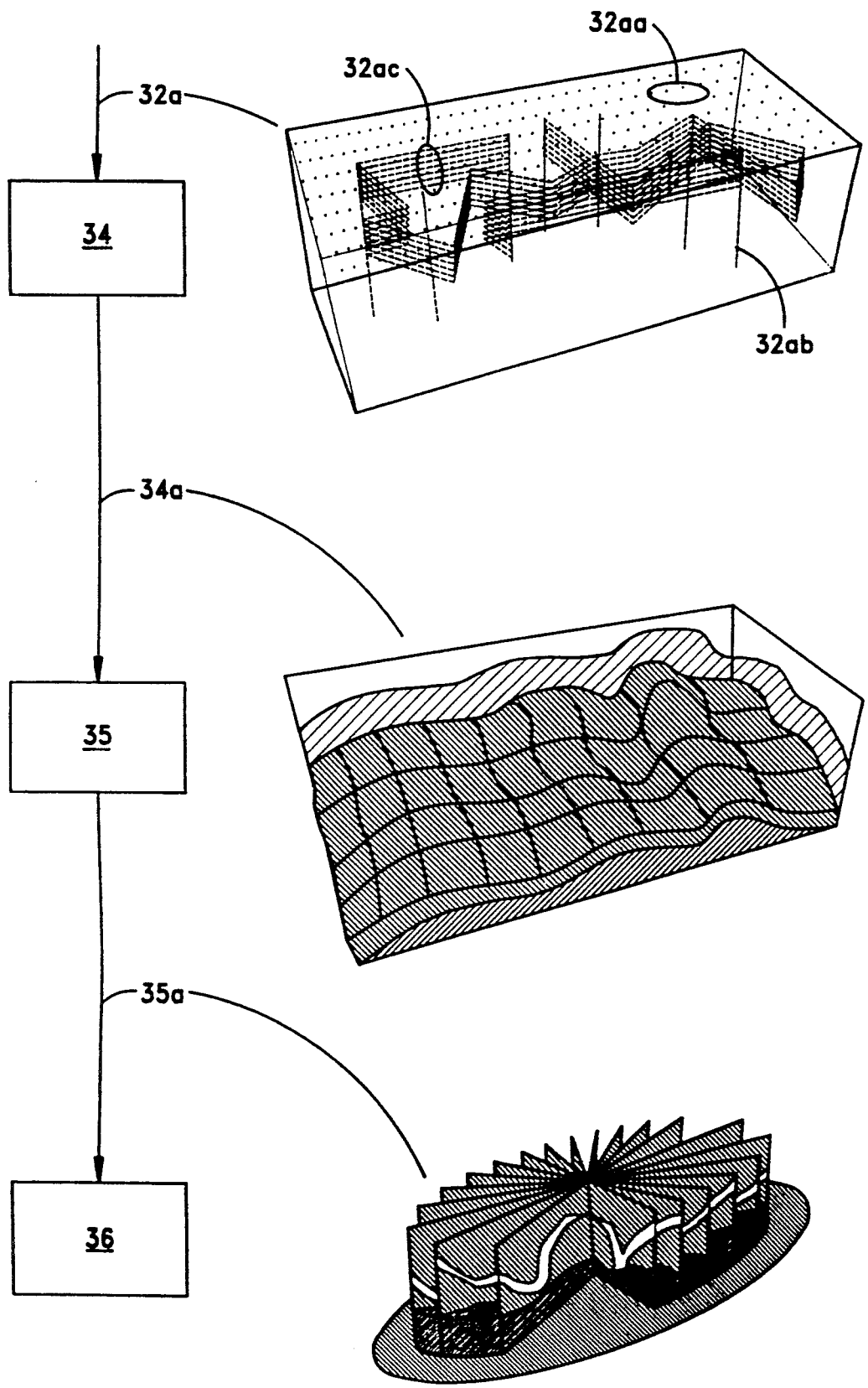
FIG. 8 presents a graphical presentation of collected data, a derived three-dimensional oceanographic model, and a derived tactical model as may be created by the system of the subject invention.

FIG. 8 graphically presents elements of the process shown in FIG. 7. Collected data 32a from various sources is shown spatially distributed over the volume of interest. It is comprised, in this example, of a surface "grid" 32aa representing remotely sensed or synoptic data, vertical "threads" 32ab represent parameter depth profiles from either historical or in situ measurements (e.g., expendable bathythermograph), and a "fence-like" structure 32ac representing continuous parameter vertical profiling using techniques to be described later. This data is transformed through an interpolation, extrapolation process 34, to create a three-dimensional oceanographic model 34a for the entire VOI. This and other models are inputs for various oceanographic and tactical models 35 whose results 35a are input to a volumetric rendering process 36 to aid in visualization and analysis. In FIG. 8 acoustic propagation paths on radial slices centered on the platform's current position have been computed and rendered.

Figure 9:
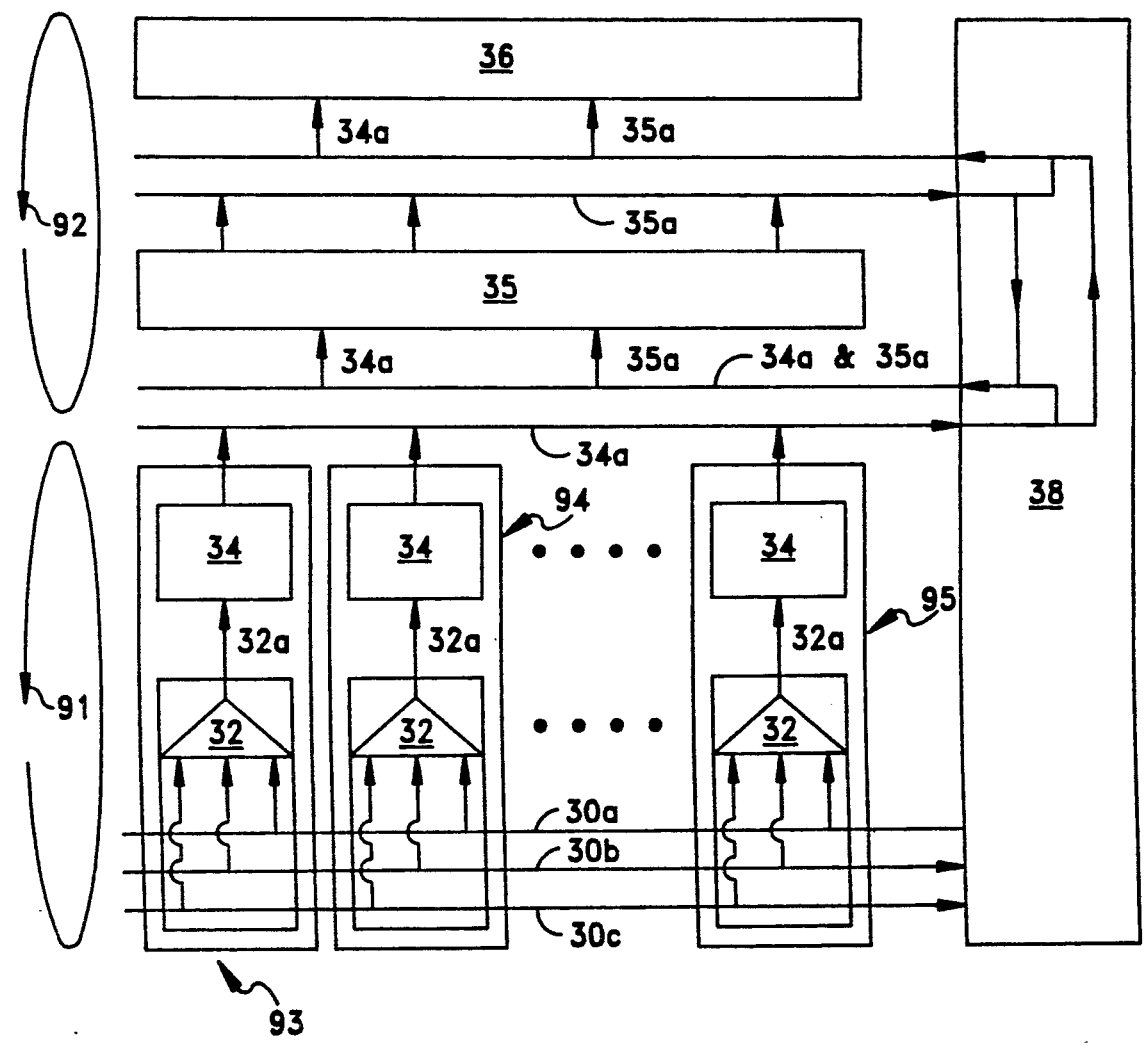
FIG. 9 represents a block diagram showing the parallel and cyclical nature of the data collection, modelling, and display performed by the system.

FIG. 9 shows the inherently parallel nature of the system's data collection, modelling and display processing. Concurrent and continuous or periodic processing 91 of multiple types of environmental data 93, 94, 95, etc., is performed. Each iteration improving or attempting to maintain the overall quality of the respective three-dimensional ocean models. Further, oceanographic and tactical analysis models 35 are periodically recomputed 92 to account for underlying ocean model changes and platform position changes within the volume. These results are then rendered 36 as required by the operator.

Figures 10A, 10B:
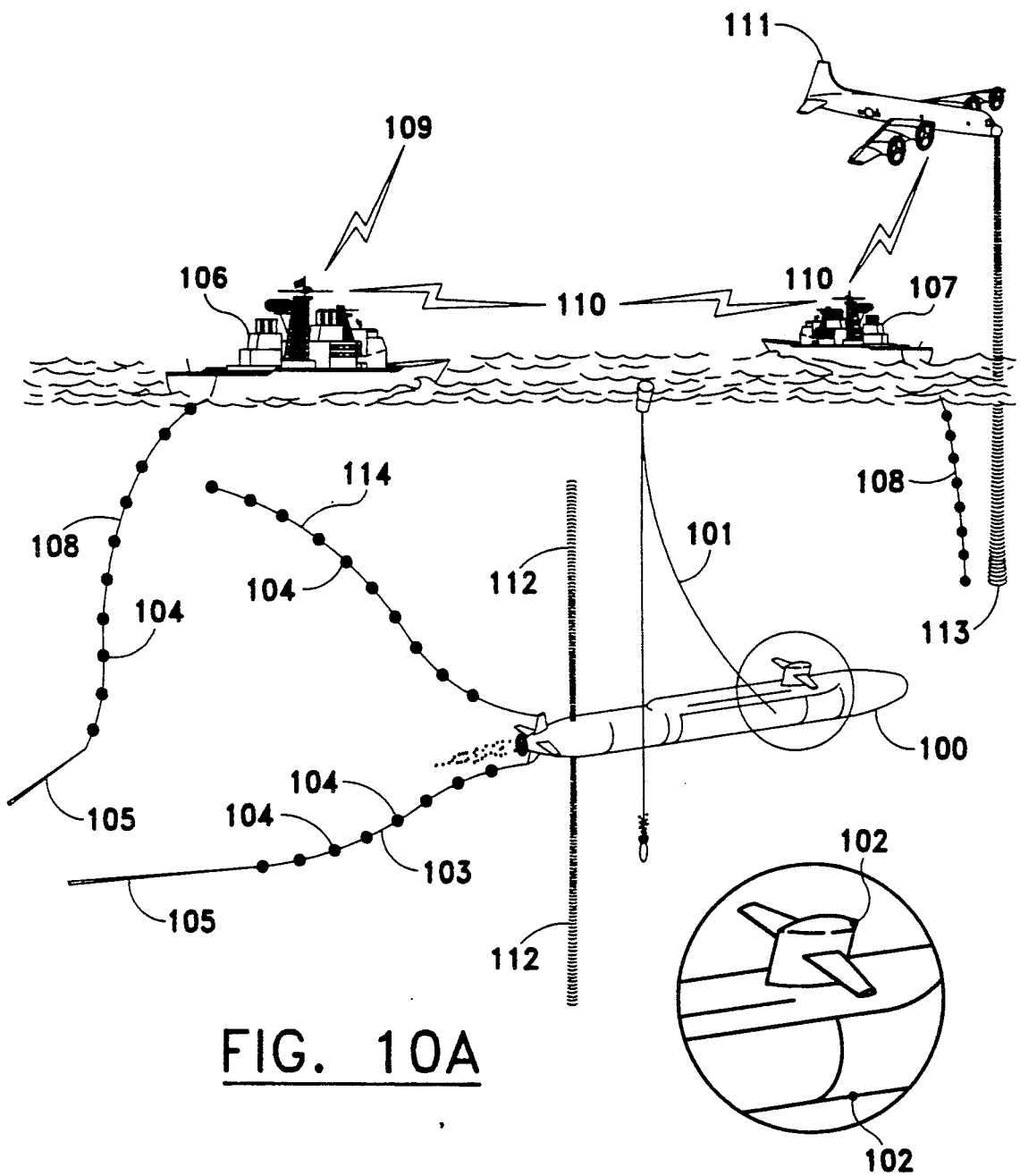
FIG. 10A presents a pictorial view of the various data collection methods and types of platforms that may benefit from the invention and FIG. 10B is an enlarged representation of a part of FIG. A.

FIG. 10 pictorially shows the employment of the system at sea from a variety of research and naval platforms. Submarine 100 can be seen to be employing a traditional submarine expendable bathythermograph (SSXBT) 101 to measure temperature as a function of depth. It is also equipped with various hull-mounted sensors 102, as are currently used by systems like TOMS. The towed array acoustic sensors 105, used by both submarines 100 and surface ships 106 and 107, are electrically and physically attached to their platforms by means of a simple tow cable 103 and 108 respectively. An innovation to be realized as part of the present invention is the addition of sensor modules 104 along the length of these tow cables at intervals appropriate for sampling ocean parameters in the vertical extent. In this way continuous covert vertical sampling may be achieved without the need for a special towed environmental sensor 114, which may also be used to increase the vertical sampling aperture. Remotely sensed and synoptic data may be sent by various communications links 109 to surface platforms, or submarines while at periscope depth. Platforms 100, 107, and 111 may share collected data and model information via existing communication links 110, such as, the Naval Tactical Data System (NTDS) Link 11. Submarine 100 is shown employing remote sensing techniques 112 to measure various ocean parameters. Lidar 112 remote sensing techniques to measure temperature (i.e., by Raman spectroscopy), and acoustic doppler current profiling, also shown as 112, to measure velocity shear in the water column are but some of the known techniques that the system may exploit to continuous or periodically collect oceanographic data. Aircraft 111 is also shown employing a remote sensing system 113, perhaps lidar, infrared, or other known systems.

The preferred embodiment presented describes the system as being interfaced to other tactical systems. The present invention may also be realized as an embedded part of tactical, or research, system. Further, the system may be included as part of training and evaluation systems where it would provide realistic environmental simulation and on-line tactical analysis support.

(2) Concept of Operation

The following concept of operation provides an example how the present invention would be used operationally by a naval submarine. Referring again to FIG. 10, a submarine is equipped with an acoustic array 105 pulled by an instrumented (e.g., temperature, salinity, and pressure sensors 104) tow cable 103; and hull-mounted thermistors and sound velocity measuring devices 102 extending from the top of the sail to the keel. Over time, as the submarine patrols an assigned area, using a pseudo-random or deliberate search pattern, it collects environmental data sensed directly through its sensors, or indirectly as in the case of inertial velocity measured by the submarine's inertial navigation system. Ignoring for the moment dynamic changes in the ocean volume, the more data collected the better the volume model becomes. An initial data set may be based solely on historical SSXBT data and/or a satellite obtained ocean surface temperature map. Each submarine track leg effectively creates a vertical data swath through the volume. Data collected is continuously integrated and a new volume model is computed periodically, or aperiodically (e.g., at the end of each course leg). The real-time comparison of the modelled versus submarine collected data is a measure of volume model quality, and a large difference is one method that can be used to trigger recalculations of the volume model. Ocean volume models of tactical significance are used as inputs to a variety of tactical models required by the operator. The operator specified tactical models are periodically updated by the system as the platform moves through the VOI. The operator uses various analysis, and visualization techniques to create suitable tactical displays for decision making. Further, the sampling distribution within the VOI provides important insight for the tactical user as to the validity/quality of the computed tactical models. The system also provides information to, and performs processing for, other tactical systems on request.

Because of the time-dependent nature of the ocean environment and the inherent data sampling interval, the system explicitly accounts for ocean dynamics using spatial and temporal filtering techniques. For example, daily changes in the ocean surface layer depth, and the more slowly-evolving changes to the gross ocean structure (which occur on the order of multiple days to multiple months) each imply different filtering rules to determine the best data set for volume modelling at a given time. The system provides insight into temporal and spatial changes of value to both oceanographers and naval commanders.

The present invention is equally applicable for surface ships operating independently or in groups (i.e., formation). When in formation, data could be exchanged at periodic intervals using NTDS. Sampling of the water volume by multiple cooperating platforms will reduced the sampling period required to develop useful models in comparison to the single platform data collection approach.

In summary, the invention is a device and process for creating detailed volumetric ocean models, which in turn are used as inputs for naval oceanographic and tactical analysis. Near-real-time volumetric modelling is accomplished by continuously integrating, filtering interpolating, and extrapolating oceanographic data (e.g., temperature, sound velocity, conductivity, pressure, salinity, bathymetry, current, chlorophyll) from historical data bases, forecasts, remote sensors, and onboard sensors. This provides periodic volumetric models of the time-varying local ocean environment. Real-time modelling for oceanographic and tactical analysis is accomplished with the aid of an advanced parallel processor architecture which provides the necessary computational power. Tactical and oceanographic model results are displayed using three-dimensional visualization software and hardware techniques. Continuous comparison of the computed model with measured data provides significant insight into the quality and uncertainty of the derived models, and thus provides information that aids decision making. These results may also be shared with other tactical or analysis systems. The system may be used on a submarine, surface ship, or aircraft.

What is claimed is:

1. A method for performing in situ oceanographic and tactical analysis using integrating, filtering, interpolating, extrapoling, storing and display means, wherein said method includes the steps of:

integrating real-time continuously collected oceanographic data sets using integrating means with historical, and forecasted oceanographic data to derive data sets representative of a selected local ocean volume;

filtering said oceanographic data sets using said filtering means;

interpolating three-dimensionally said oceanographic data sets to derive volumetric models of said ocean volume;

extrapolating three-dimensionally said oceanographic data sets to derive volumetric models of said ocean volume;

utilizing said derived volumetric models as inputs to three-dimensional oceanographic and tactical analysis models;

using said derived three-dimensional tactical and analysis model results as inputs to other three-dimensional tactical and analysis models;

displaying said derived there-dimensional oceanographic, tactical, and analysis volumetric models using said displaying means for an operator;

storing said measured and derived data and models in a memory storage device using said storing means; and distributing said three-dimensional oceanographic, tactical, and analysis volumetric models to other systems.

2. The method according to claim 1 wherein said integrating step includes:
   collecting environmental data from onboard historical data bases;
   collecting oceanographic data from a plurality of environmental and navigation sensors mounted on a vehicle;
   collecting oceanographic data from a plurality of remote sensing systems, including other platforms with similar systems;
   collecting synoptic oceanographic data from other modelling systems;
   collecting oceanographic data from an instrumented tow cable of an acoustic array; and
   collecting data from a special oceanographic sensor array.

3. The method of claim 2 wherein said step of collecting oceanographic data from an instrumented tow cable includes the data from a communication line.

4. The method of claim 2 wherein said step of collecting oceanographic data from an instrumented cable includes the data from a buoy.

5. The method according to claim 1 wherein said filtering of all oceanographic data sets includes continuous production of an data set for the current VOI.

6. The method according to claim 5 wherein said data filtering further includes using further spatial and temporal analysis techniques to determine on a continuous basis an optimal data for volume modeling.

7. The method according to claim 6 wherein said step of interpolating volume on said oceanographic data sets includes operating on time-varying nature of the ocean environment, data sample distributions, continuous stream of in situ measured data and observed and computer volume structural statistics.

8. The method according to claim 7 wherein said step of interpolating is performed on a continuous basis such that an optimal volume model is available at any given time.

9. The method according to claim 8 wherein said step of computing on three-dimensional tactical and oceanographic analysis models is performed as determined by an operator for an updated model after changes in underlying ocean models and platform position.

10. The method according to claim 1 wherein said steps of interpolating, extrapolating, modelling, and computing are performed by an advanced processor architecture suitable for parallel processing type tasks.

11. A method according to claim 8 wherein the spatial and temporal distributing of the oceanographic data being used by the system itself includes modeling to create a volume uncertainty model to provide the operator with an intuitive understanding of quality of the models he is displaying, to use as an input to other models so that their results may directly reflect the uncertainty in the input data and to plan future sampling.

12. A method according to claim 11 wherein the difference between predicted and measured data is used to provide a measure of model quality, and a control factor in the data interpolation, and extrapolation process.

13. A method according to claim 12 by which the system exploits platform track crossings (i.e., the platform visits location x,y,z at time t1 and t2) to directly measure the local change in the ocean environment that occurred during the intervening time interval (i.e., $t2-t1$).

14. A method according to claim 13 by which the system performs platform track planning and makes recommendations to account for volume sampling uncertainty, to account for operational and navigational constraints imposed by an operator, to produce pseudorandom platform maneuvering behavior that will support the requirement for operational stealth and to exploit crossing track geometries that will provide information on volume dynamics.

15. The method according to claim 13 which further includes calculating the volumetric difference between volume models, of the same volume, computed over different time intervals so as to estimate the dynamic change in said volume and the quality of said model and other dependent models.

* * * * *